US012808245B2

(12) United States Patent
Zimmer et al.

(10) Patent No.: US 12,808,245 B2
(45) Date of Patent: Nov. 24, 2026

(54) RETRACTING AND EXTENDING DEVICE COMPRISING BIDIRECTIONAL RETRACTING DEVICES

(71) Applicants: Günther Zimmer, Rheinau (DE); Martin Zimmer, Rheinau (DE)

(72) Inventors: Günther Zimmer, Rheinau (DE); Martin Zimmer, Rheinau (DE)

( * ) Notice: Subject to any disclaimer, the term of this patent is extended or adjusted under 35 U.S.C. 154(b) by 0 days.

(21) Appl. No.: 19/120,822

(22) PCT Filed: Oct. 12, 2023

(86) PCT No.: PCT/DE2023/000129
§ 371 (c)(1),
(2) Date: Jul. 14, 2025

(87) PCT Pub. No.: WO2024/078654
PCT Pub. Date: Apr. 18, 2024

(65) Prior Publication Data

US 2026/0146488 A1 May 28, 2026

(30) Foreign Application Priority Data

Oct. 14, 2022 (DE) ..................... 10 2022 003 805.6

(51) Int. Cl.
*E05F 1/16* (2006.01)
*A47B 88/47* (2017.01)
*E05F 5/00* (2017.01)

(52) U.S. Cl.
CPC ................ *E05F 1/16* (2013.01); *A47B 88/47* (2017.01); *E05F 5/003* (2013.01);
(Continued)

(58) Field of Classification Search
None
See application file for complete search history.

(56) References Cited

U.S. PATENT DOCUMENTS 8,418,406 B2 * 4/2013 Zimmer .................. E05F 5/003
16/49
9,879,459 B2 * 1/2018 Zimmer ................ F16C 41/001
(Continued)

FOREIGN PATENT DOCUMENTS

DE 102008009046 A1 9/2009
DE 102017004611 A1 11/2018
(Continued)

*Primary Examiner* — Marcus Menezes

(57) ABSTRACT

A retracting and extending device for sliding doors or drawers includes a housing in which at least one retracting device having a combined acceleration and deceleration device is arranged and in which at least one extending device is arranged. The retracting device and the extending device can be coupled together by means of at least one switchable axial coupling on the basis of the stroke range. A carriage includes such a retracting and extending device. A door guide rail includes a carriage inserted therein. The retracting and extending device has a second retracting device arranged in the aforementioned housing. The combined acceleration and deceleration device is both a part of the first retracting device and a part of the second retracting device. The compact retracting and extending device enables an expanded range of possible applications.

10 Claims, 8 Drawing Sheets

(52) U.S. Cl.
CPC ... *E05Y 2201/708* (2013.01); *E05Y 2900/132* (2013.01); *E05Y 2900/20* (2013.01)

(56) References Cited

U.S. PATENT DOCUMENTS

| | | | | |
|---|---|---|---|---|
| 11,384,583 | B2 * | 7/2022 | Zimmer | E05F 1/16 |
| 11,391,075 | B2 * | 7/2022 | Montecchio | E05F 1/16 |
| 2010/0007254 | A1 * | 1/2010 | Zimmer | E05F 5/027 312/333 |
| 2011/0023370 | A1 | 2/2011 | Zimmer et al. | |

FOREIGN PATENT DOCUMENTS

| | | | |
|---|---|---|---|
| DE | 102018008203 | A1 | 4/2020 |
| DE | 102018008204 | A1 | 4/2020 |
| EP | 3461980 | A1 | 4/2019 |
| EP | 3581746 | A1 | 12/2019 |

* cited by examiner

RETRACTING AND EXTENDING DEVICE COMPRISING BIDIRECTIONAL RETRACTING DEVICES

CROSS-REFERENCE TO RELATED APPLICATION

This application is a national stage application, filed under 35 U.S.C. § 371, of International Patent Application PCT/DE2023/000129, filed on Oct. 12, 2023, which claims the benefit of German Patent Application DE 10 2022 003 805.6, filed on Oct. 14, 2022.

BACKGROUND

An example of a retracting and extending device is known from DE 10 2017 004 611 A1. This device is suitable for objects with large masses and for high inertial forces.

SUMMARY

The disclosure relates to a retracting and extending device for sliding doors or drawers, comprising: a housing in which at least one retracting device having a combined acceleration and deceleration device is arranged, and in which at least one extending device is arranged, wherein the retracting device and the extending device can be coupled together by means of at least one switchable axial coupling on the basis of the stroke range; a carriage comprising such a retracting and extending device; and a door guide rail comprising a carriage inserted therein.

The present disclosure is based on the problem of developing a compact retracting and extending device with an expanded range of possible applications.

This problem is solved by the features of the retracting and extending device as described herein. To this end, the retracting and extending device has a second retracting device arranged in the aforementioned housing. The combined acceleration and deceleration device is both a part of the first retracting device and a part of the second retracting device.

Two retracting devices and at least one extending device are arranged in the housing of the retracting and extending device. A first retracting device is coupled by means of an axial coupling to the extending device in a final operating position when the extending device is released from a locked position and when the extending device is moved out from the locked position. When they are moved into the final operating position, the coupling partners of the axial coupling are separated from one another.

Each of the two retracting devices has a follower element, which can be moved relative to the housing between a parked position and an end position. The two follower elements are oriented so as to be opposite each other. They have a shared combined acceleration and deceleration device. Thus, a sliding door or a drawer can be decelerated into both a closed and an open, final operating position. From the closed, final operating position, for example, the sliding door or the drawer can be reopened by means of exerting an external load on it in the closing direction. However, the sliding door or the drawer can also be pulled directly from this final operating position, without releasing the extending device.

Further details of the invention will become apparent from the following description of schematically illustrated embodiments.

BRIEF DESCRIPTION OF THE DRAWINGS

FIG. 1 with housing shell removed.

DETAILED DESCRIPTION

Figure 1:
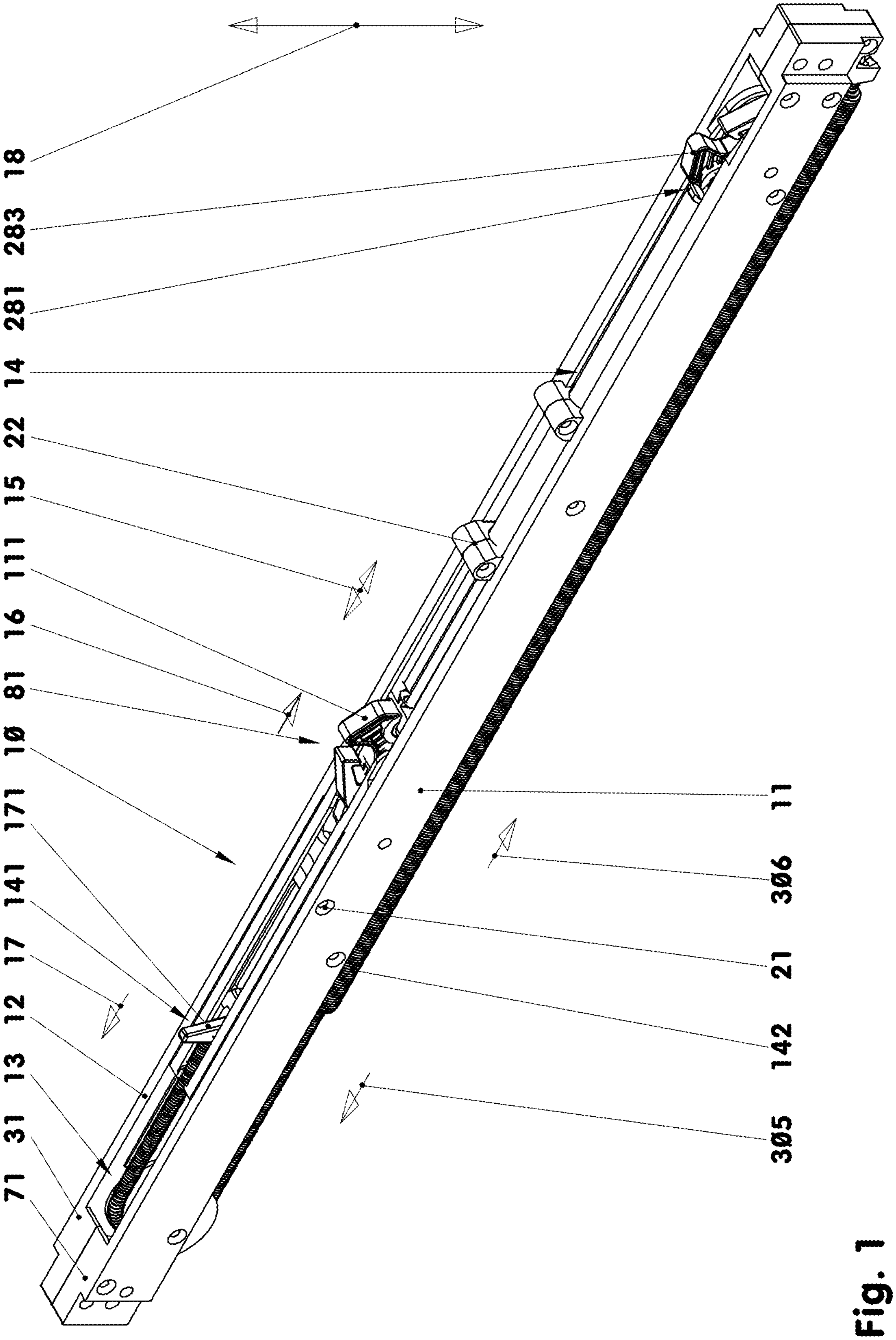
FIG. 1: combined retracting and extending device.

FIGS. 1-9 show a combined retracting and extending device (10) as well as some component parts thereof. Individual functional statuses of the retracting and extending device (10) are illustrated in FIGS. 10-20. Such retracting and extending devices (10) are used, inter alia, in sliding door systems (2) or in drawer systems.

When used in a sliding door system (2) (cf. FIGS. 22-24), the retracting and extending device (10) is, for example, part of a carriage (6) which is the fastened to the top side of a sliding door leaf (8). At least one track roller (7) of the carriage (6) is arranged at each of the ends of the retracting and extending device (10) that are oriented in a longitudinal direction (15). All of the track rollers (7) run in a door guide rail (3) stationarily arranged in a building or in a cabinet. At least one stationary follower (5) which contacts the retracting and extending device (10) is arranged in the door guide rail (3).

It is also conceivable to arrange the retracting and extending device (10) on the frame side. The follower (5) is then fastened to the sliding door leaf (8). Even when used in a drawer system, the retracting and extending device (10) can be arranged either on the drawer or on the furniture carcass.

In a sliding door system (2) consisting of a door guide rail (3) and a carriage (6), the entire carriage (6) moves within the door guide rail (3) in a manner invisible from the outside. In this case, the door guide rail (3) can have a square or rectangular cross-section have. In the case of a rectangular cross-section, one edge length is at most 5% longer than the other edge length.

The retracting and extending device (10) has a housing (11), in which, in the illustrated exemplary embodiment, an extending device (141), a first retracting device (81) and a second retracting device (281) are arranged. The retracting devices (81; 281) and the extending device (141) illustrated in the figures are arranged one behind the other in the housing (11). The length, oriented in the longitudinal direction (15), of the housing (11) is 420 millimetres in the exemplary embodiment. The individual retracting device (81; 281) has the task of, for example, conveying the sliding door leaf (8) into a closed final operating position (301) or into an open final operating position (303). In the exemplary embodiment, when closing the sliding door leaf (8), the housing (11) is moved in the closing direction (305) relative to the stationary follower (5). In the illustrations in FIGS. 1, 2 and 10-20, the closing direction (305) is oriented to the left with respect to the housing (11). The opening direction (306) is directed to the right. Both the opening direction (306) and the closing direction (305) are oriented in the longitudinal direction (15).

By means of the first retracting device (81), the housing (11) is conveyed in the closing direction (305). The retraction direction (16) of this retracting device (81) relative to the housing (11) is oriented to the right in the illustrations. The retraction direction (282) of the second retracting device (281) relative to the housing (11) is oriented in the opposite direction.

The housing (11) is conveyed in the opening direction (306) by means of the extending device (141). The extension direction (17) relative to the housing (11) is oriented to the left in the illustrations. Both the retraction directions (16; 282) and the extension direction (17) are oriented in the longitudinal direction (15).

Each retracting device (81; 281) has a follower element (111; 283), also referred to herein as a catch member, which interacts with a combined acceleration and deceleration device (82). A combined acceleration and deceleration device (82) has an acceleration device (83) and a deceleration device (91) connected in parallel thereto. The resultant of the acceleration and the deceleration acts on the follower element (111; 283). The combined acceleration and deceleration device (82) forms the drive of the retracting device (81; 281). In the exemplary embodiment, both retracting devices (81; 281) have the same acceleration device (83) and the same deceleration device (91). The acceleration device (83) is formed by a first spring energy store (83) designed as a tension spring. This first spring energy store (83) is held with a first spring end (84) in the first follower element (111) and with a second spring end (85) in the second follower element (283).

The deceleration device (91) has a cylinder-piston unit (92). The cylinder-piston unit (92) has a cylinder (93) and a piston (95) adjustable therein by means of a piston rod (94), cf. FIG. 9. The cylinder (93) is mounted in the housing (11) such that it can be displaced in the longitudinal direction (15). In the illustrations in FIGS. 1 and 2, the first follower element (111) is pivotably mounted on the piston rod (94). The second follower element (283) is pivotably mounted on the cylinder bottom (96).

The extending device (141) has a detent lever carrier part (151) that can be moved in the housing (11). A detent lever (171) is pivotably mounted in the detent lever carrier part (151). The detent lever carrier part (151) is loaded in the extension direction (17) by means of a second spring energy store (142). The second spring energy store (142) is the drive for the extending device (141). In the exemplary embodiment, the second spring end (143) of the second spring energy store (142) is held in a housing-side spring holder (66). The second spring energy store (142) is designed as a tension spring (142). In the illustration in FIG. 2, the tension spring (142) has two regions (144, 145) of different diameters. In a first region (144) adjoining the detent lever carrier part (151), the tension spring (142) has a cross-sectional area that corresponds to, e.g., 0.8% of the length of the housing (11). This region (144) is guided around a return pulley (221). The arc of contact is 180 degrees in this illustration. The deflection radius is, e.g., three times the diameter of the tension spring (142) in this first region (144). In the illustrated exemplary embodiment, the diameter of the second region (145) of the tension spring (142) is, e.g., more than twice that of the first region (144). Due to its geometric configuration, the second spring energy store (142) has a first region (144) of high spring rigidity and a second region (145) of low spring rigidity.

The housing (11) has a first housing shell (31) and a second housing shell (71). The two housing shells are a mirror-image of each other with respect to a vertical longitudinal midplane of the housing (11). The first housing shell (31) and the second housing shell (71) are connected to each other, for example force-fittingly, form-fittingly or integrally. In the exemplary embodiment, they are screwed together by means of multiple screws. The housing (11) is cuboid, cf. FIG. 3. The height oriented normal to the longitudinal direction (15) is, e.g., 4.5% of the length and the depth oriented normal to the two aforementioned directions is also, e.g., 4.5% of the length. In the illustrations in FIG. 2 as well as in FIGS. 10-21, the retracting and extending device (10) is illustrated without the second housing shell (71).

Figures 2, 3, 4, 5:
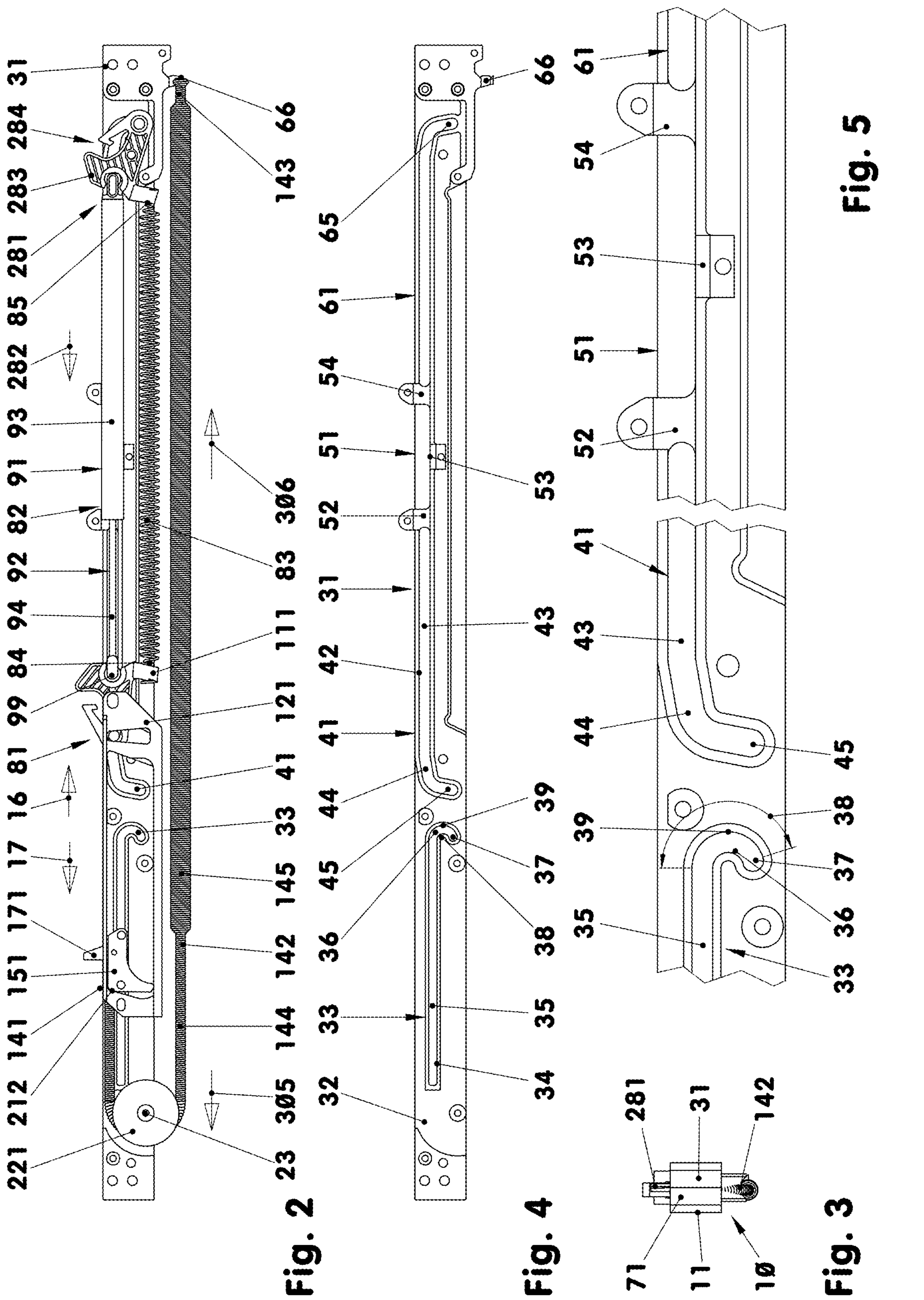
FIG. 2.
FIG. 3: front view of FIG. 1.
FIG. 4: housing shell.
FIG. 5: detail of FIG. 4.

On the top side (12), the housing (11) has two longitudinal slots (13, 14) spaced apart from each other by a cross-bar (22). The detent lever (171) and the first follower element (111) protrude from the housing (11) through a first longitudinal slot (13) shown on the left in FIGS. 1 and 2. In these illustrations, the detent lever (171) is in a stop position (176). Here, a stop surface (174) of the detent levers (171) is at least approximately perpendicular to the housing top side (12). The extending device (141) is illustrated in FIGS. 1 and 2 in a central position between a locked position (147) and a standby position (146). The first follower element (111) is illustrated in a position between a first follower element parked position (112) and a first end position (113).

The second follower element (283) protrudes from the second longitudinal slot (14) illustrated on the right in the aforementioned FIGS. 1 and 2. The second follower element (283) is illustrated in the aforementioned figures in a second follower element parked position (284). In this follower element parked position (284), the second follower element (283) is secured in the housing (11) with a force-fit and/or form-fit.

FIG. 4 shows the inner face (32) of the first housing shell (31). FIG. 5 shows some details in an enlarged illustration. Together with the inner face of the second housing shell (71), four guideway systems (33, 41, 51, 61) are provided in the housing (11). Each of the guideway systems (33, 41, 51, 61) has two guideways (34, 41, 52, 53, 54) facing each other.

A first guideway system (33) is provided below the first longitudinal slot (13). This guideway system (33) is referred to in the following as an extending guideway system (33). The individual first guideway (34) has a straight section (35) and a curved section (36) adjoining the latter, as well as a locking section (37) adjoining the curved section (36). The length of the first guideway (34) in the longitudinal direction (15) is, e.g., 22% of the length of the housing (11). The first guideway (34) has a constant height, which is 3 millimetres in the exemplary embodiment.

The curved section (36) is arranged on the straight section (35) towards a vertical transverse midplane of the housing (11). The bend is oriented in the direction away from the longitudinal slot (13). The middle radius of the curved section (36) is, e.g., 28% larger than the height of the first guideway (34). The sector angle (38) of the curved section (36) is 160 degrees in the exemplary embodiment. This sector angle (38) is at least 120 degrees. The straight locking section (37) adjoins the region of the sector angle (38). The length of this locking section (37) corresponds to, for example, half the height of the first guideway (34).

In the exemplary embodiment, the second guideway system (41) is arranged in the longitudinal direction (15) at least one approximately centrally in the housing (11). This second guideway system (41) is also referred to in the following as a first retracting guideway system (41). Its length is, e.g., 22% of the length of the housing (11). The second guideway system (41) has a second guideway (42) with a horizontal section (43), an oblique section (44) and a securing section (45) for each housing shell (31, 71). These sections (43, 44, 45) merge into one another. Their height is a third higher than the height of the first guideway system (33). The second guideway system (41) is offset relative to the first guideway system (33) by 80% of its height towards the first longitudinal slot (13). The mutual spacing between the first guideway system (33) and the second guideway system (41) in the longitudinal direction (15) is, for example, 2.5% of the length of the housing (11). In this case, the spacing between the curved section (36) and the securing section (45) forms the shortest spacing.

The horizontal section (43) is oriented parallel to the longitudinal direction (15). Its length is, e.g., 87% of the length of the second guideway system (41). The oblique section (44) encloses an angle of, e.g., 10 degrees with the longitudinal direction (15). Its length is, e.g., 7.5% of the length of the second guideway system (41). The securing section (45) encloses an angle of, e.g., 80 degrees with the longitudinal direction (15). Its length is, e.g., 20% greater than the aforementioned height of the second guideway (42). It points in the direction away from the first longitudinal slot (13).

In the illustrations in FIGS. 4 and 5, the third guideway system (51) is arranged next to the second guideway system (41) on the side facing away from the extending guideway system (33). The third guideway system (51) is also called cylinder guide system (51) hereinafter. It is designed as a straight guide. The length of the third guideway system (51) is, e.g., 12.5% of the length of the housing (11). This third guideway system (51) has three guide shells (52, 53, 54) per housing side. These guide shells (52-54) are congruent to each other in their transverse plane oriented normal to the longitudinal direction (15). The nominal diameter of the guide shells (52-54) corresponds to the nominal diameter of the cylinder (93), wherein the housing (11) forms a clearance fit with the cylinder (93).

The fourth guideway system (61) is a second retracting guideway system (61). It is arranged and designed as a mirror-image to the first retracting guideway system (41). The plane of mirror symmetry is the vertical transverse midplane of the cylinder guide system (51). For example, the fourth guideway system (61) can also have a different length, a differently arranged securing section, etc. than the second guideway system (41).

The spring holder (66) is provided below the securing section (65) of the second retracting guide system (61). The return pulley (221) for the second spring energy store (142) sits on a connecting pin (23) of the housing (11) in the region of the carriage-side end of the extending guideway system (33).

Figure 6:
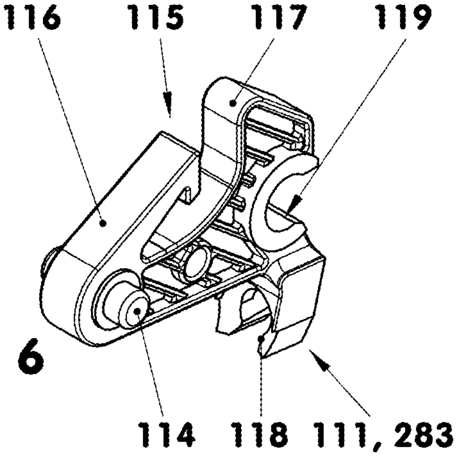
FIG. 6: follower element.

FIG. 6 shows a follower element (111; 283). The two follower elements (111; 283) are identical in design, for example. The individual follower element (111; 283) has a respective guide pin (114) on each of its two sides as well as two follower clasps (116, 117) that delimit a follower recess (115). The two follower clasps (116, 117) are a retraction clasp (116) lying at the rear in the retraction direction (16) and a push and pull-out clasp (117) lying at the front in the retraction direction (16). If necessary, the follower element (111; 283) can be designed to be elastically deformable in certain regions of the follower clasps (116, 117). The follower element (111; 283) has a spring mount (118) on its underside. In the exemplary embodiment, the first spring energy store (83) is held in the spring mounts (118) of the two follower elements (111; 283). On the side facing away from the guide pin (114), the follower element (111; 283) has a guide block recess (119). The cross-sectional area of the guide block recess (119) is, for example, bounded by a segment of a circle with an angle of, e.g., 245 degrees.

In the illustration in FIG. 2, the guide pins (114) of the first follower element (111) are seated in the horizontal section (34) of the first retracting guideway system (41). The guide pins (114) the second follower elements (283) are seated in the securing section (65) of the second retracting guideway system (61). A second guide for the follower element (111; 283) is formed by a guide block (97; 98) in each case. This guide block (97; 98) is seated in the guide block recess (119) of the follower element (111; 283) in each case. It has two guide bolts (99) with an, e.g., oval cross-section.

The guide blocks (97; 98) are parts of the deceleration device (91). In the exemplary embodiment, a first guide block (97) is fastened to the piston rod head (101) of the piston rod (94). In the illustration in FIG. 2, this guide block (97) sits with a cylindrical middle piece (102) in the guide block recess (121) of the first follower element (111), cf. FIG. 9. A second guide block (98) is fastened to the cylinder bottom (96) of the cylinder (93). This guide block (98) is pivotably connected to the second follower element (283).

Figure 7:
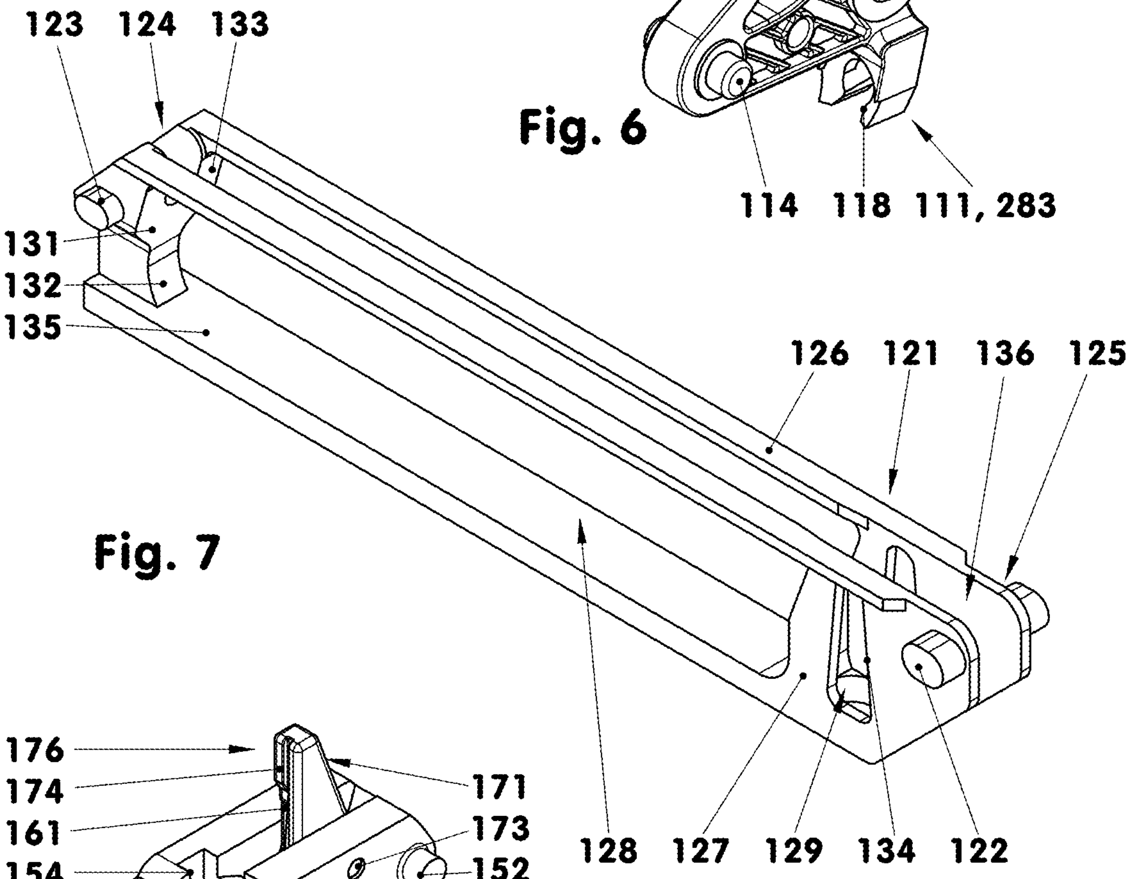
FIG. 7: slide.

FIG. 7 shows the slide (121) of the first retracting device (81). The slide (121) is designed like a U-shaped channel profile. It has a guide pin (122, 123) on both sides at each of its ends. These guide pin (122, 123) have, for example, an oval cross-section. The length of the slide (121) is, e.g., 28% of the length of the housing (11).

The slide (121) has a coupling side (124) at the end illustrated here on the left and a follower side (125) at the other end. The guide pins (123) on the coupling side (124) are, e.g., arranged lower than the guide pins (122) on the follower side (125). The height difference corresponds to the height difference between the extending guide system (33) and the first retracting guide system (41). The slide (121) built into the housing (11) is seated with the follower-side guide pins (122) in the retracting guide system (41) and with the coupling-side guide pins (123) in the extending guide system (33).

On its upper side, the slide (121) has one reinforcing rib (126) on each of its two sides. This connects the follower side (125) and the coupling side (124). When the retracting and extending device (10) has been assembled, the reinforcing ribs (126) are, e.g., flush with the top side (12) of the housing (11).

The two flanks (127) of the slide (121) are congruent to each other. They have a relief passage (128) and a guide passage (129). By way of example, two housing screws (21) pass through the slide (121) in the region of the relief passages (128). On the coupling side (124), the relief passage (127) is bounded by a coupling wall (131). The coupling wall (131) connects the two flanks (127).

The coupling wall (131) has two coupling faces (132, 133) in the exemplary embodiment. These are arranged one above the other. A bottom coupling face (132) is referred to in the following as release coupling face (132). In the exemplary embodiment, the release coupling face (132) is a single-axis arched surface that covers an angle of 50 degrees. The radius of the release coupling face (132) is, e.g., 1.6% of the length of the housing (11).

The release coupling face (132) merges continuously with the coupling wall (131) into the further coupling face (133), a loading coupling face (133). In the exemplary embodiment, the loading coupling face (133) is inclined towards the longitudinal direction (15) by 16 degrees with respect to a normal plane. In this case, the end of the loading coupling face (133) adjoining the reinforcing rib (126) is closer to the guide passage (129) than its end oriented towards the release coupling face (132).

The guide passages (129) are arranged on the follower side (125) of the slide (121). They have a cross-sectional area which has at least approximately the design of an isosceles triangle. The angle enclosed by the two limbs (134) of equal length is 10 degrees, for example. Here, the notional tip of the angle is located above the housing (11). When the slide (121) is built in, the lower limb of the guide passage (129) is located in the height direction (18) below the securing sections (45) of the retracting guide systems (41). In the illustration in FIG. 2, the guide pins (114) of the first follower element (111) pass through the guide passages (129) of the slide (121).

The bottom (135) of the slide (121) has a plate-like construction. The slide (121) has a follower element cut-out (136) on the follower side (125).

Figure 8:
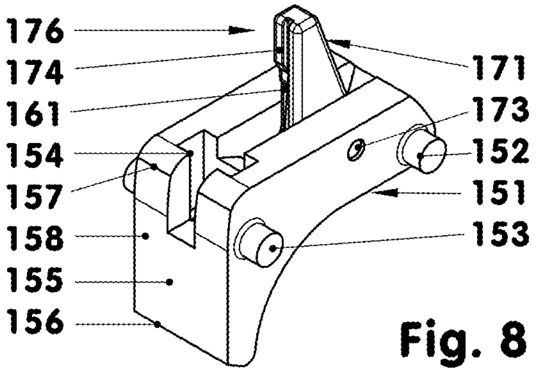
FIG. 8: detent lever carrier part with detent lever.

FIG. 8 shows a detent lever carrier part (151) with inserted detent lever (171). The detent lever carrier part (151) has two guide bolts (152, 153) on each of its two sides. When the detent lever carrier part (151) has been installed, the guide bolts (152, 153) are displaceably mounted in the extending guide system (33).

The detent lever (171) is pivotably mounted in the detent lever carrier part (151). It is wedge-shaped, for example. Its face pointing in the retraction direction (16) is an abutment face (172). The stop surface (174) points in the extension direction (17). In the illustrations in FIGS. 2 and 8, the detent lever (171) is at least approximately perpendicular to a connecting plane of the guide bolts (152, 153). In this position, the detent lever (171) is loaded in the exemplary embodiment by means of a spring (161), e.g. a helical torsion spring (161) designed as a leg spring (161), for example against a pivot stop loaded. From the upright position, the detent lever (171) can be pivoted into an at least approximately horizontal position due to the load of the spring (161), cf. FIG. 19. The pivot axis (173) of the detent lever (171) is parallel to the guide bolts (152, 153) on both sides.

At the end pointing in extension direction (17), the detent lever carrier part (151) has a spring mount (154). In the illustration the FIG. 2, the second energy store (142) is held in this spring mount (154). The detent lever carrier part (151) has an impact wall (155) underneath the spring mount (154).

The impact wall (155) has at least two impact regions (156, 157). These are arranged mutually offset in the height direction (18). In the exemplary embodiment, the impact wall (155) has a lower release region (156), a transition region (158) and an upper loading region (157).

In the exemplary embodiment, the release region (156) is formed by the e.g. rounded bottom edge of the impact wall (155). The release region (156) has a linear design in the exemplary embodiment. This line is oriented parallel to the centre line of the guide bolts (152, 153). A convex design of the section of the impact wall surrounding the release region (156) is also conceivable. The release region is then reduced to a point. The transition region (158) is flat, for example. It is, for example, normal to a plane in which all guide bolts (152, 153) of the detent lever carrier part (151) lie. The loading region (157) adjoins the upper end of the transition region (158). It is inclined from the bottom upwards in the retraction direction (16), for example by 10 degrees relative to the transition region (158). The transitions between the individual regions can have an arched design.

Together with the slide (121), the detent lever carrier part (151) forms two switchable axial couplings (211, 212). These are a release coupling (211) and a loading coupling (212). The release coupling (211) is formed when the release coupling face (132) of the slide (121) comes into contact with the release region (156) of the detent lever carrier parts (151). The loading coupling (212) is closed when the loading region (157) of the detent lever carrier parts (151) bears against the loading coupling face (133) of the slide (121). The two axial couplings (211, 212) can have a force-fit or a form-fit design.

Figure 9:
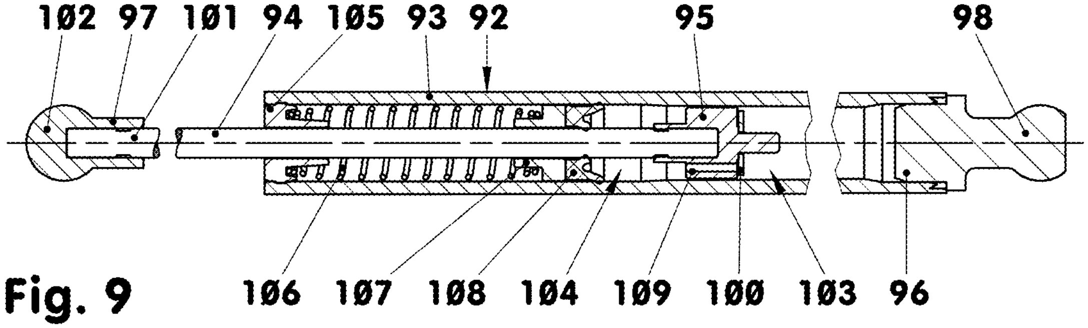
FIG. 9: cylinder-piston unit.

FIG. 9 shows the cylinder-piston unit (92) of the deceleration device (91). The illustrated cylinder-piston unit (92) is a hydraulic cylinder-piston unit (92). It is also conceivable to use a pneumatic cylinder-piston unit (92). The length of the cylinder (93) corresponds, for example, to the length of the slide (121). The stroke of the piston (95) and the piston rod (94) is, e.g., 16% of the length of the housing (11). The inside diameter of the cylinder (93) is, for example, 1.5% of the length of the housing (11).

In the cylinder (93), the piston (95) separates a displacement chamber (103) from a compensation chamber (104). The compensation chamber (104) is arranged on the piston rod side. A compensating spring (106) is arranged between the cylinder head (105) and the compensation chamber (104). This compensating spring is designed as a compression spring and loads a cylinder disc (107) against which a piston rod seal (108) bears.

The displacement chamber (103) is arranged between the piston (95) and the cylinder bottom (96). The piston (95) has, for example, three throttle ducts (109) which pass through the piston (95) in the longitudinal direction (15). An e.g. flexible baffle (100) covers the throttle ducts (109) on the side of the displacement chamber (103). When the piston (95) and the cylinder bottom (96) approach each other, hydraulic oil, for example, is throttled and displaced from the displacement chamber (103) into the compensation chamber (104). In this case, the baffle (100) is pressed onto the piston (95). When the volume of the compensation chamber (104) is enlarged, the compensating spring (106) is compressed.

If the spacing between the piston (95) and the cylinder bottom (96) is enlarged, oil is displaced out of the compensation chamber (104) into the displacement chamber (103). In this case, the baffle (100) is raised, thus increasing the flow-through cross-section of the piston (95). At the same time, the load on the compensating spring (106) is relieved.

Figure 23:
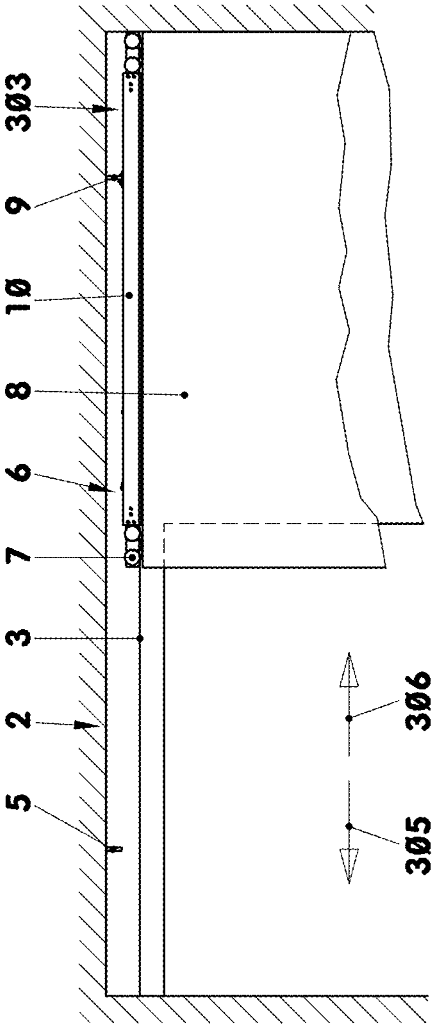
FIG. 23: system with sliding door, open.
Figure 24:
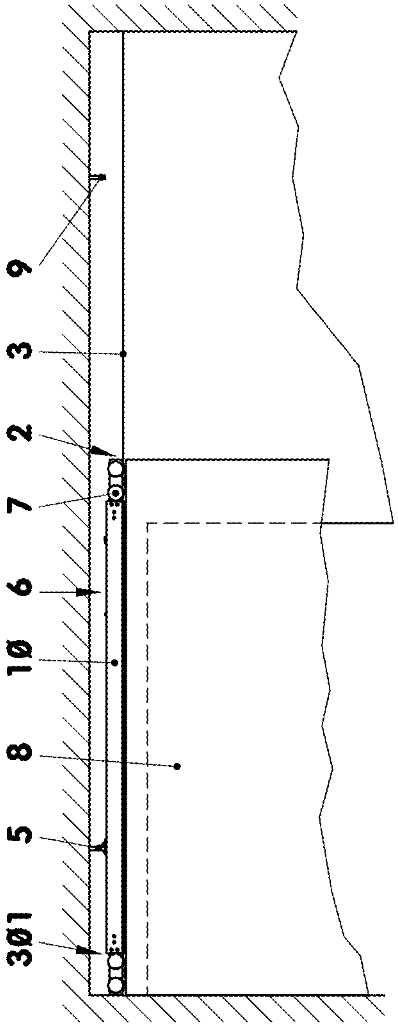
FIG. 24: system with sliding door, closed.

During assemble, track roller sets with one or more track rollers (7) are assembled at both ends of the retracting and extending device (10) to form a carriage (6), cf. the FIGS. 23 and 24. The overall length of the carriage (6) is, for example, equal to 600 millimetres or more. The carriage (6) thus produced is inserted into a door guide rail (3). A first follower (5) and, for example, a second follower (9), which followers (5, 9) may also be referred to herein as engagement members, are arranged spaced apart from each other in the door guide rail (3). The two frame-side followers (5, 9) are fixed in place. The sliding door leaf (8) is hung on the carriage (6).

Figure 10:
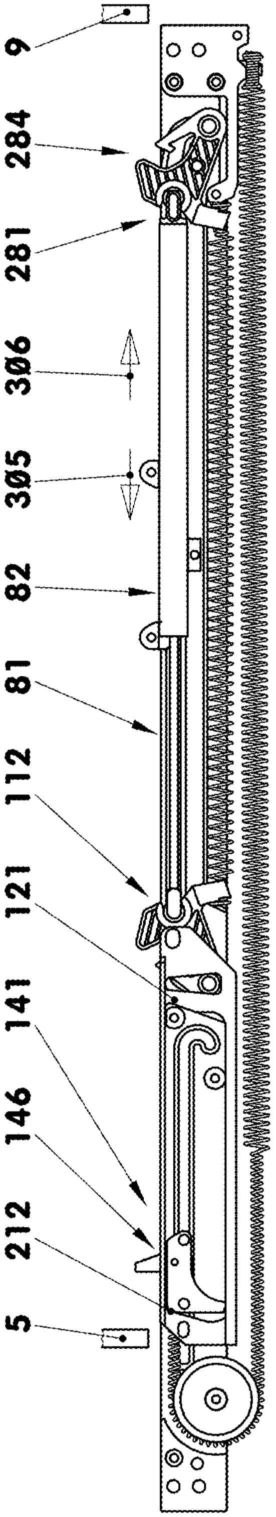
FIG. 10: retracting and extending device when in an initial position.

FIG. 10 shows, for example, the retracting and extending device (10) with the sliding door in a central position. None of the followers (5, 9) has any contact with the retracting and extending device (10). The extending device (141) is in a standby position (146). In this standby position (146), the detent lever carrier part (151) is near to the end of the extending guide system (33) that points in the closing direction (305). The second spring energy store (142) is relaxed to a residual energy value. In addition, the load on the leg spring (161) is relieved, so that the detent lever (171) is in its pivoted-out stop position (176).

The follower elements (111, 283) of the two retracting devices (81; 281) are each in a follower element-parked position (112; 284). The first spring energy store (83) of the retracting and extending device (10) is loaded. The piston rod (94) of the cylinder-piston unit (92) of the deceleration device (91) is extended. The slide (121) bears with the second loading coupling face (133) against the loading region (157) of the detent lever carrier part (151). The loading coupling (212) is closed.

Figure 11:
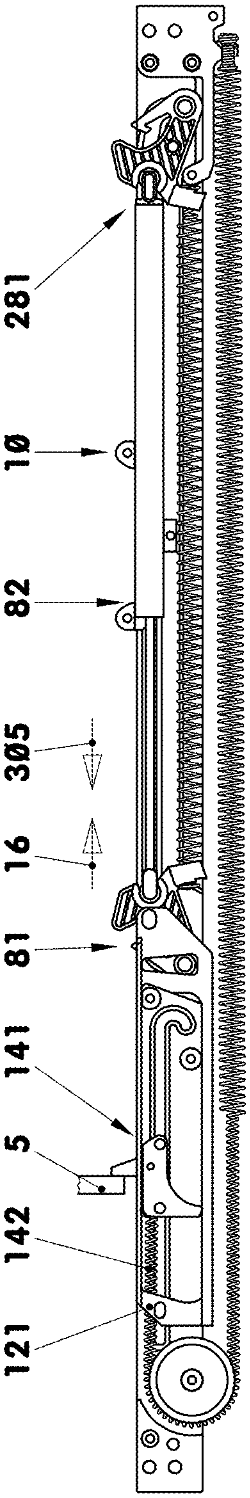
FIG. 11: retracting and extending device after start of the retraction movement.

When closing the sliding door leaf (8) or the drawer is closed in the closing direction (305), the detent lever (171) contacts the first follower (5), cf. FIG. 11. The detent lever (171) is moved together with the detent lever carrier part (151) relative to the housing (11) in the retraction direction (16) along the first guideway system (33). The second spring energy store (142) is tensioned. The detent lever carrier part (151) disengages from the slide (121). The loading coupling (212) is opened. The first retracting device (81) including the slide (121) does not move. The follower element (283) of the second retracting device (281) stays in the second follower element-parked position (284).

During the further, e.g. manual closing of the sliding door, the latter is moved further relative to the fixed frame. The housing (11) is moved in the closing direction (305) relative to the detent lever carrier part (151) held in place by the follower (5). The second spring energy store (142) is loaded. The detent lever carrier part (151) travels along the extending guide system (33). As soon as the front guide bolts (152) reach the curved section (36) of the extending guide system (33), the detent lever carrier part (151) pivots relative to the longitudinal direction (15). The second spring energy store (142) is further loaded until the front guide pin (152) has overcome the apex (39) of the curved section (36). Subsequently, the front guide bolt (152) is pulled into the locking section (37) while the load on the second spring energy store (142) is relieved.

Figure 12:
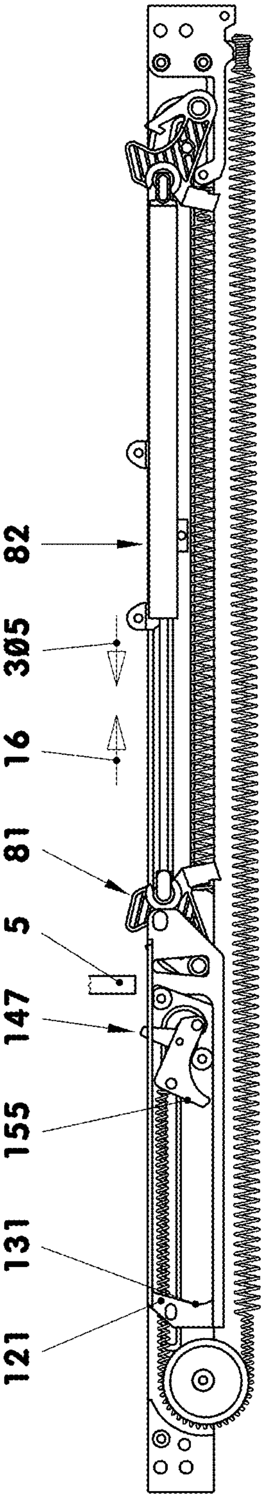
FIG. 12: retracting and extending device with tensioned extending device.

FIG. 12 shows the extending device (141) in a locked position (147). The detent lever (171) with the detent lever carrier part (151) is pivoted, wherein the first guide bolts (152) of the detent lever carrier part (151) sit in the locking section (37) of the extending guide system (33). The second guide bolts (153) remain in the straight sections (35) of the extending guideway system (33). Both the first retracting device (81) and the second retracting device (281) stay in their arrested position. The first spring energy store (83) and the second spring energy store (142) are tensioned. The first follower element (5) has disengaged from the extending device (141).

Figure 13:
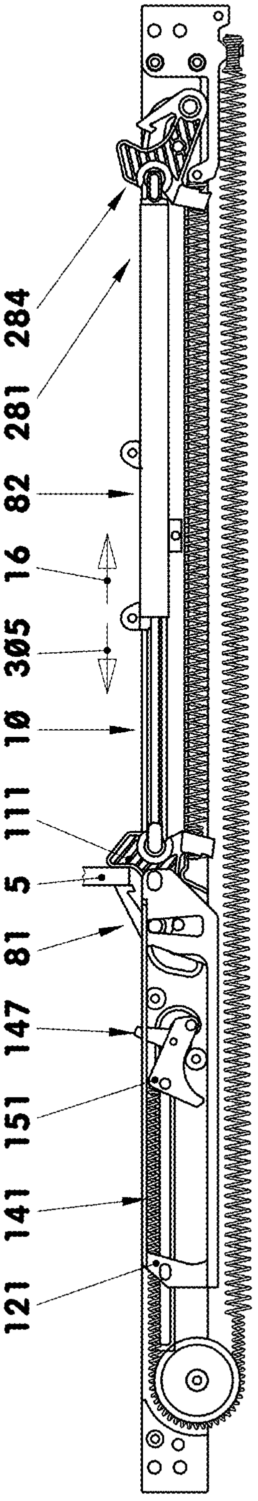
FIG. 13: retracting and extending device after the release of the retracting device.

In the illustration in FIG. 13, the follower element (111) of the first retracting device (81) has impacted the follower (5). The first retracting device (81) has been released. The first follower element (111) has pivoted up and form-fittingly engages around the fixed follower (5). The first spring energy store (83) loads the first follower element (111), which conveys the housing (11) relative to the follower (5) towards the closed final operating position (301). The piston rod (94) of the cylinder-piston unit (92) is retracted. This causes the piston (95) to compress the displacement chamber (103) in the cylinder (93), so that the acceleration applied by means of the first spring energy store (83) is counteracted by a deceleration. The slide (121) is moved relative to the housing (11) in the retraction direction (16). The extending device (141) stays in its arrested locked position (147).

Figure 14:
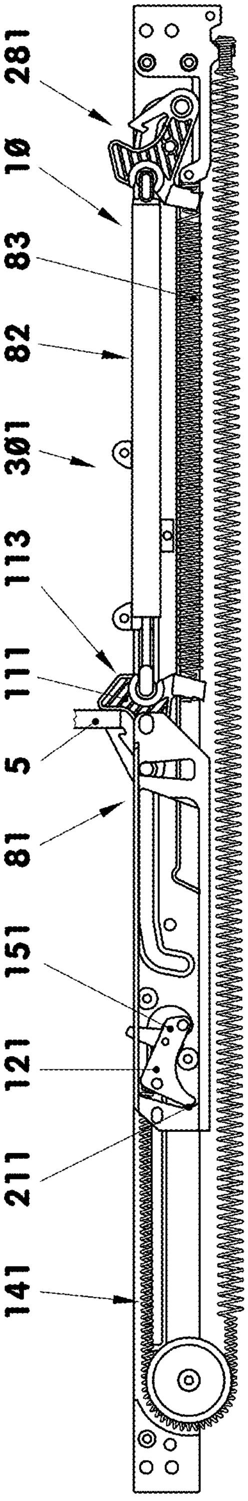
FIG. 14: retracting and extending device in a final operating position.

FIG. 14 shows the retracting and extending device (10) in the closed final operating position (301). The first follower element (111) has a small residual spacing from the end, facing away from the extending device (141), of the horizontal section (43) of the second guideway system (41). The piston rod (94) of the cylinder-piston unit (92) is almost fully retracted. The first spring energy store (83) is largely relaxed, with its force in the retraction direction (16) being, e.g., less than the static friction force of the retracting device (81) and the sliding door leaf (8). This difference in the aforementioned forces is, for example, less than the spring load of the in the second spring energy store (142) arrested in the locked position (147), reduced by the frictional force of the extending device (141).

The extending device (141) is tensioned. The slide (121) bears against the detent lever carrier part (151). The release coupling (211) between the first retracting device (81) and the extending device (141) is closed; cf. the detail illustration in FIG. 15. The retracting device (81) and the extending device (141) are in contact with each other, e.g. in a contact line (213). A further movement of the retracting device (81) in the retraction direction (16) is prevented by means of the extending device (141). In the exemplary embodiment, the sliding door is visually closed for the operator in the closed final operating position (301).

Figure 16:
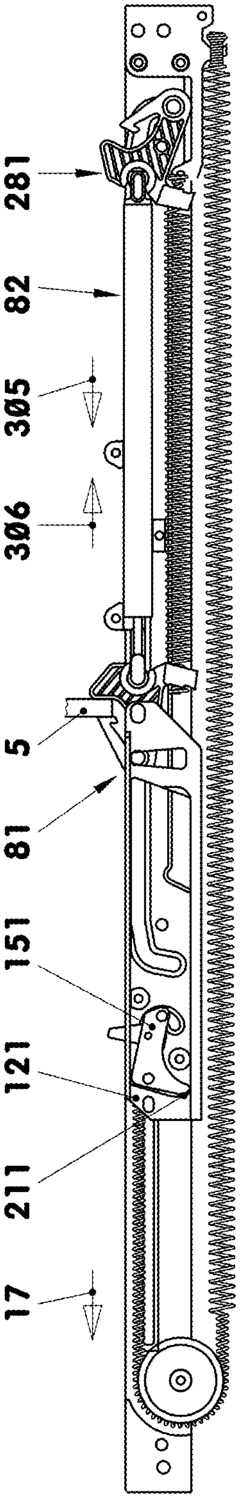
FIG. 16: retracting and extending device when opening from the final operating position.
Figure 15:
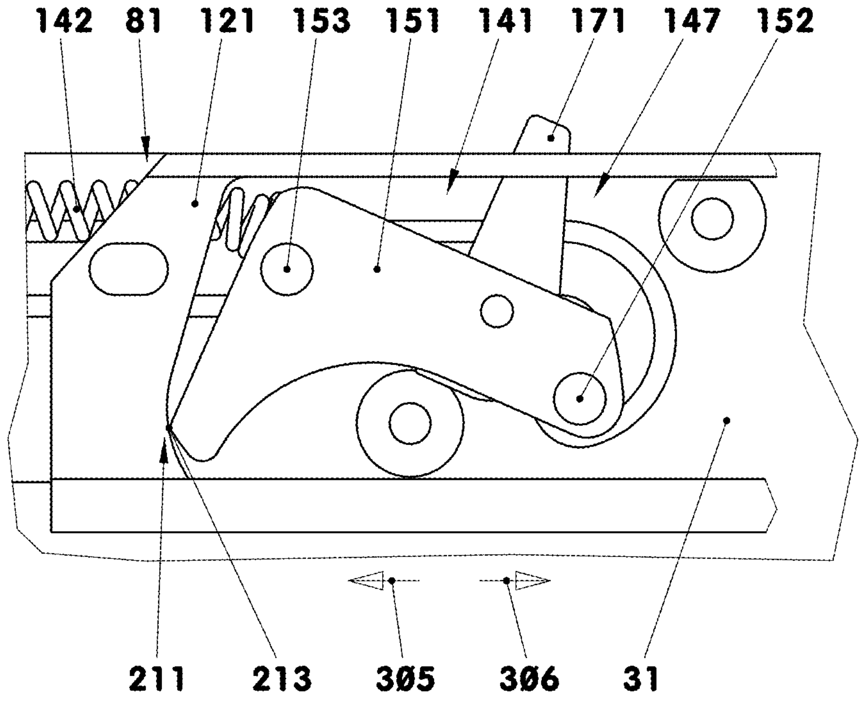
FIG. 15: detail of the release coupling in the final operating position.

The start of the opening movement of the sliding door is illustrated in FIG. 16. To this end, the sliding door leaf (8) is first pressed, e.g. manually, with the housing (11) from the closed final operating position (301) in the closing direction (305) until, for example, the residual clearance is used up. The housing (11) is loaded relative to the follower element (111) of the retracting device (81) that is arrested by means of the first follower (5). The load on the first spring energy store (83) is further relieved. At the same time, the housing (11) moves the locked detent lever carrier part (151) relative to the slide (121). A thrust is applied to the detent lever carrier part (151) via the release coupling (211). The force vector is oriented in the longitudinal direction (15). It loads the detent lever carrier part (151) in the release region (156). The force vector of the release coupling loads the locked detent lever carrier part (151) outside a rectangle, which is braced in this locked position (147) by the guide bolts (152, 153). The force vector lies on the side of the aforementioned rectangle facing away from the detent lever (171).

The force transmitted via the release coupling (211) is transmitted to the detent lever carrier part (151) as a pivot force and as thrust. The detent lever carrier part (151) is pivoted by means of the pivot force as a torque with a lever arm about an instantaneous pivot axis and moved in the retraction direction (16). This pivot axis forms an instantaneous centre of rotation of the release movement of the detent lever carrier part (151). It is parallel to the front guide bolt (152) and the rear guide bolt (153). In this case, the first guide pin (152) migrates out of the locking section (37) into the curved section (36). As soon as the first guide bolt (152) has overcome the apex (39), the load on the second energy store (142) is relieved. The retracting device (81) has unlocked the extending device (141) by means of the transmitted forces.

The detent lever carrier part (151) is now loaded by means of the second spring energy store (142). The release coupling (211) is disconnected. The loading coupling (212) is subsequently closed. The transition from the release coupling (211) to the loading coupling (212) can be continuous.

Figure 18:
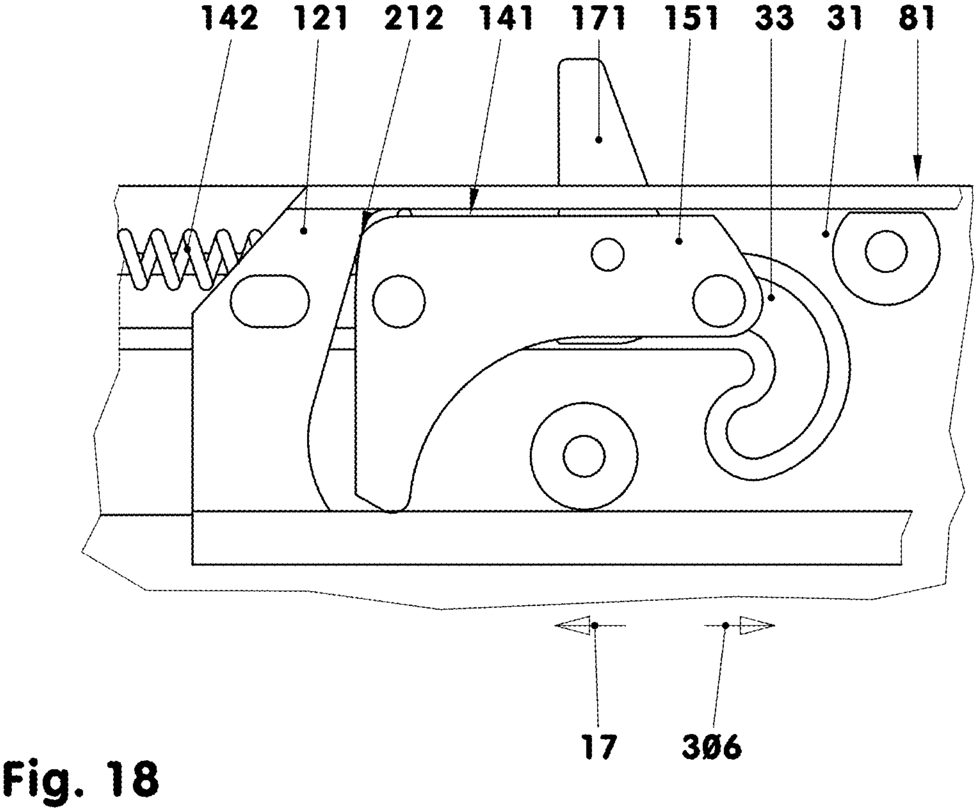
FIG. 18: detail of the loading coupling.
Figure 17:
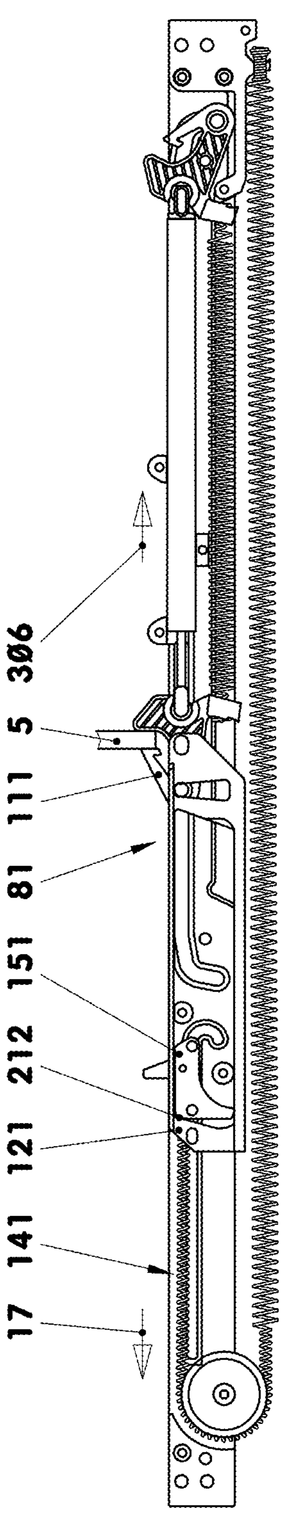
FIG. 17: retracting and extending device with partially open sliding door.
Figure 19:
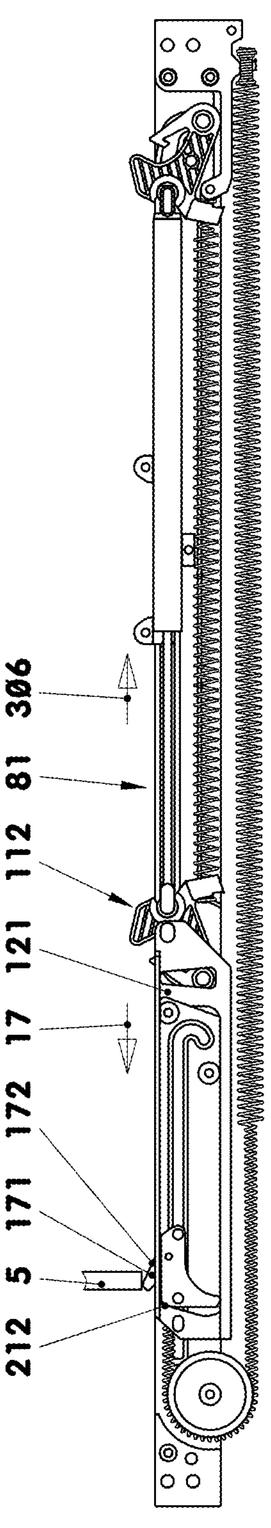
FIG. 19: retracting and extending device with pivoted detent lever.

FIG. 17 shows the retracting and extending device (10) when opening the sliding door. The second spring energy store (142) pulls the detent lever carrier part (151) relative to the housing (11) as it discharges. The loading coupling (212) stays closed. This makes the slide (121) move relative to the housing (11) by means of the detent lever carrier part (151). The slide (121) pulls the first follower element (111) with it, which migrates relative to the housing (11) in direction of its follower element-parked position (112). The first follower element (111) continues to engage around the follower (5). The housing (11) is thus moved relative to the follower element (111) of the retracting device (81) in the opening direction (306). This movement of the follower element (111) relative to the housing (11) charges the first spring energy store (83). At the same time, the piston rod (94) is pulled out relative to the cylinder (93). FIG. 18 shows a detail of the closed loading coupling (212).

As the movement in the opening direction (306) continues, the first follower element (111) pivots into the securing section (45). The first follower element (111) is blocked in the follower element-parked position (112). The first energy store (83) is loaded. The follower (5) disengages from the follower element (111). The sliding door can now manually be opened further. The second spring energy store (142) is discharged to a residual energy value. The slide (121) limits the further stroke of the detent lever carrier part (151). The retracting device (81) is tensioned. This causes the retracting device (81) to limit the pull-out stroke of the extending device (141).

As soon as the follower (5) has left the detent lever (171), i.e. the sliding door is further open, the tension of the leg spring (161) causes the detent lever (171) to pivot up. The retracting and extending device (10) now returns to the starting position illustrated in FIG. 10. The renewed closing takes place as described above.

The sliding door can also be opened without the described pushing action. Proceeding from the closed final operating position (301) illustrated in FIG. 14, the sliding door is pulled with the housing (11), e.g. by hand, relative to the door frame in the opening direction (306). In the process, the housing (11) is pulled relative to the temporarily stationary first follower element (111) in the opening direction (306). This opens the release coupling (211). The extending device (141) stays in its locked position (147). When the sliding door is closed again, the housing (11) travels with the e.g. still locked extending device (141) relative to the follower (5). In this case there is no contact between the follower (5) and the extending device (141). As soon as the retracting device (81) is released is, the sliding door closes further, as described above.

If the sliding door only opened partially, the retracting and extending device (10) is, for example, between the positions shown in FIGS. 16 and 17. When the sliding door is closed again, the operator pushes the sliding door counter to the force of the extending device (141) in the closing direction (305). This causes the follower (5) to push the first follower element (111) towards the end position (113). The follower element (111) pulls the slide (112), additionally loaded in the retraction direction (16) by means of the retracting device (81), with it. via the loading coupling (212), the slide (121) pushes the detent lever carrier part (151) together with the detent lever (171) in the retraction direction (16). As soon as the first guide bolt (152) of the detent lever carrier part (151) reaches the apex (39) of the curved section (36), the detent element carrier part (151) is secured in the locked position (147). At the same time, the follower element (111) has reached the closed final operating position (301). The sliding door is closed.

Figure 20:
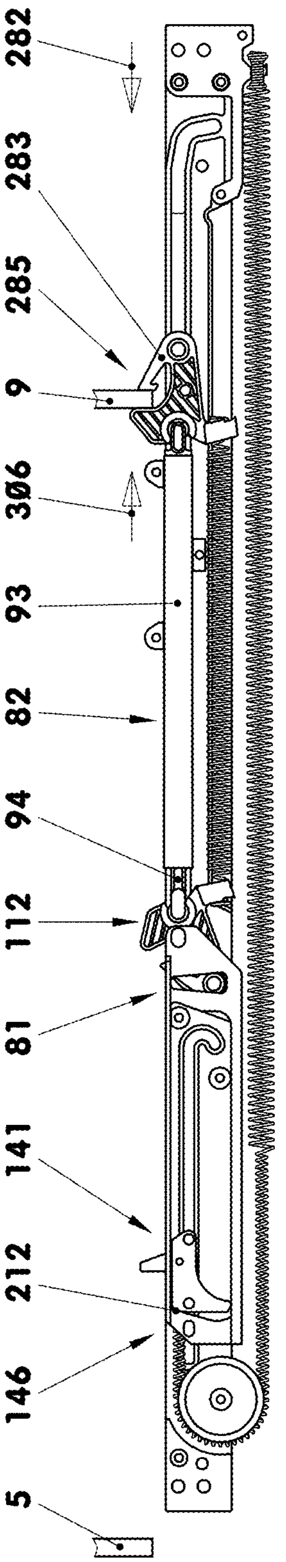
FIG. 20: retracting and extending device with fully open sliding door.

When the sliding door reaches the fully open position, the second follower element (283) contacts the second follower (9) in a partial stroke, adjacent to the open final operating position (303), of the sliding door stroke. The second follower element (283) is released from its follower element-parked position (284) and form-fittingly couples with the second follower (9). The combined acceleration and deceleration device (82) acts on the movement of the housing (11) relative to the second follower element (283) by superimposing an acceleration by means of the first spring energy store (83) and a deceleration by means of the cylinder-piston unit (92). The sliding door is decelerated in the open final operating position (303), where it without remains without making contact. FIG. 20 shows the combined retracting and extending device (10) in this position. The second follower element (283) is in a second end position (285).

Figure 21:
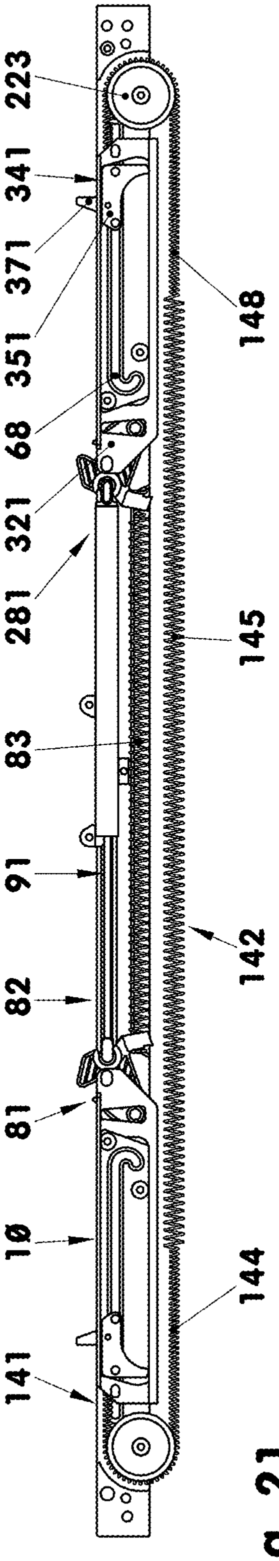
FIG. 21: bidirectional retracting and extending device.

FIG. 21 shows a bidirectional combined retracting and extending device (10). This has a first retracting device (81), a second retracting device (281), a first extending device (141) and a second extending device (341). These are arranged in a shared housing (11). Each extending device (141; 341) is assigned to a retracting device (81; 281).

The housing (11) is a mirror image of a vertical transverse midplane. This transverse midplane extends in the exemplary embodiment through the middle of the cylinder guide system (51). Arranged in the housing (11) is the second extending guide system (68). In the illustration in FIG. 21, this is located at the right-hand end of the retracting and extending device (10).

The first retracting device (81) is a mirror image of the second retracting device (281). Each of the retracting devices (81; 281) has a follower element (111; 283) and a slide (121; 321). The slide (121) of the first retracting device (81) is displaceably mounted in the first retracting guide system (41) and in the first extending guide system (33). The slide (321) of the second retracting device (281) is displaceably mounted in the second retracting guide system (61) and in the second extending guide system (68). Both retracting devices (81, 281) have a shared acceleration device (83) and a shared deceleration device (91). These are designed as described in connection with the first exemplary embodiment.

The first extending device (141) has a first detent lever carrier part (151) and a first detent lever (171). These are designed as described in connection with the first exemplary embodiment.

The second extending device (341) has a second detent lever carrier part (351) and a second detent lever (371). The second detent lever (371) is mounted in the second detent lever carrier part (351) so that it can pivot relative to the second detent lever carrier part (351).

In this exemplary embodiment, both extending devices (141, 341) have a shared second spring energy store (142). This is deflected around a first return pulley (221) and around a second return pulley (223) and connects the first detent lever carrier part (151) to the second detent lever carrier part (153). The second spring energy store (142) has, for example, three regions of different diameters. In the exemplary embodiment, the second region (145) has twice the diameter of the first region (144) and of the third region (148). The first region (144) and the third region (148) are each deflected around one of the return pullies (221; 223). In the exemplary embodiment, the arc of contact is 180 degrees in each case. The middle region (145) has a lower spring rigidity than the two outer regions.

The sliding door is opened from the closed final operating position (301) as described above. Before the sliding door reaches an open final operating position (303), the second extending device (341) is loaded. Subsequently, the sliding door is conveyed into the open final operating position (303) by means of the second retracting device (281). In this open final operating position (303), further opening is prevented by means of the second extending device (341) and the second slide (321). If the sliding door is pushed further in the opening direction (306) by hand, the second extending device (341) is released. The sliding door is moved towards the closed position. This is done in the same way as when it is released from the closed final operating position (301).

Figure 22:
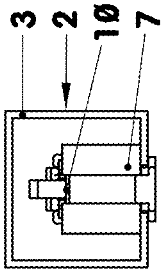
FIG. 22: front view of a system with support rail and sliding door.

FIG. 22 shows a front view of the sliding door system consisting of a door guide rail (3) and a carriage (6) for a sliding door. The carriage (6) is seated fully in the door guide rail (3). The door guide rail (3) has a square or rectangular cross-section, wherein one edge length is a maximum of 15% longer than another edge length.

Combinations of the individual exemplary embodiments are also conceivable.

LIST OF REFERENCE NUMERALS

2 sliding door system
3 door guide rail
5 follower, first follower
6 carriage
7 track roller
8 sliding door leaf
9 second follower
10 device, combined retracting and extending device
11 housing
12 top side of (11), housing top side
13 longitudinal slot, first longitudinal slot
14 longitudinal slot, second longitudinal slot
15 longitudinal direction
16 retraction direction, relative to (11)
17 extending direction, relative to (11)
18 height direction
21 screws, housing screws
22 cross-bar
23 connecting pin of (11)
31 housing shell, first housing shell
32 inner face of (31)
33 first guideway system, extending guideway system
34 first guideway
35 straight section of (34)
36 curved section of (34), arc section
37 locking section
38 sector angle, angle of arc
39 apex of (36)
41 second guideway system, first retracting guide system
42 second guideway
43 horizontal section
44 oblique section
45 securing section
51 third guideway system, cylinder guide system
52 guide shell
53 guide shell
54 guide shell
61 fourth guideway system, second retracting guideway system
65 securing section of (61)
66 spring holder
68 second extending guide system
71 housing shell, second housing shell
81 retracting device, first retracting device
82 combined acceleration and deceleration device, drive of (81)
83 acceleration device, first spring energy store
84 first spring end of (83)
85 second spring end of (83)
91 deceleration device
92 cylinder-piston unit
93 cylinder
94 piston rod
95 piston
96 cylinder bottom
97 guide block
98 guide block
99 guide bolt
100 baffle
101 piston rod head
102 middle piece of (97)
103 displacement chamber
104 compensation chamber
105 cylinder head
106 compensating spring
107 cylinder disc
108 piston rod seal
109 throttle ducts
111 follower element
112 follower element-parked position
113 end position
114 guide pin
115 follower recess
116 follower clasp, retracting clasp
117 follower clasp, push and pull-out clasp
118 spring mount
119 guide block recess
121 slide
122 guide pin
123 guide pin
124 coupling side
125 follower side
126 reinforcing rib
127 flanks
128 relief passage
129 guide passage
131 coupling wall

132 coupling face, release coupling face
133 coupling face, loading coupling face
134 limb of (129)
135 bottom of (121)
136 follower element cut-out
141 extending device
142 second energy store, tension spring, drive of (141)
143 second spring end of (142)
144 first region of (142)
145 second region of (142)
146 standby position
147 locked position
148 third region of (142)
151 detent lever carrier part, extending device carrier part
152 guide bolt
153 guide bolt
154 spring mount
155 impact wall
156 impact region, release region
157 impact region, loading region
158 transition region
161 spring, helical torsion spring, leg spring
171 detent lever
172 abutment face
173 pivot axis of (171)
174 stop surface
176 stop position
211 coupling, axial coupling, release coupling
212 coupling, axial coupling, loading coupling
213 contact line
221 return pulley
223 second return pulley
281 second retracting device
282 retraction direction relative to (11)
283 follower element, second follower element
284 second follower element-parked position
285 second end position
301 closed final operating position
303 open final operating position
305 closing direction relative to (5; 9)
306 opening direction relative to (5; 9)
321 slide, second slide
341 second extending device
351 second detent lever carrier part
371 second detent lever

The invention claimed is:

1. A retracting and extending device for sliding doors or drawers, comprising:

a housing;

a first retracting device arranged in the housing, the first retracting device comprising a first catch member guided in the housing and configured to engage a first engagement member;

an extending device arranged in the housing, the extending device comprising a detent lever carrier part guided in the housing and a detent lever pivotably mounted in the detent lever carrier part and configured to engage the first engagement member;

a switchable axial coupling for selectively coupling the first retracting device and the extending device;

a second retracting device arranged in the housing, the second retracting device comprising a second catch member guided in the housing and configured to engage a second engagement member; and a combined acceleration and deceleration device being part of both the first retracting device and the second retracting device, wherein the housing comprises a first longitudinal slot and a second longitudinal slot, the first catch member and the detent lever being configured to protrude from the housing through the first longitudinal slot, and the second catch member being configured to protrude from the housing through the second longitudinal slot.

2. The retracting and extending device according to claim 1, wherein the housing has two mirror-image housing shells, and wherein the extending device, the first retracting device and the second retracting device are each mounted in both of the two mirror-image housing shells.

3. The retracting and extending device according to claim 1, wherein the combined acceleration and deceleration device has a deceleration device comprising a cylinder-piston unit displaceably mounted in the housing.

4. The retracting and extending device according to claim 1, further comprising a second extending device, wherein the second extending device can be selectively coupled to the second retracting device.

5. The retracting and extending device according to claim 4, wherein the extending device and the second extending device have a shared spring energy store as a drive.

6. A retracting and extending device for sliding doors or drawers, comprising:

a housing;

a first retracting device arranged in the housing;

an extending device arranged in the housing;

a switchable axial coupling for selectively coupling the first retracting device and the extending device;

a second retracting device arranged in the housing; and a combined acceleration and deceleration device being part of both the first retracting device and the second retracting device, wherein the first retracting device and the second retracting device each have a catch member guided in the housing, wherein the extending device has a detent lever carrier part that is guided in the housing and comprises a detent lever, and wherein the detent lever is mounted spring-loaded in the detent lever carrier part so as to be pivotable towards a stop position.

7. The retracting and extending device according to claim 6, wherein the first retracting device has a slide connected to the catch member of the first retracting device, and wherein the slide has a coupling wall that points in a retraction direction of the first retracting device and can be placed on the extending device.

8. A carriage, comprising:

the retracting and extending device according to claim 6; and at least two track rollers arranged on an end face of the housing.

9. A sliding door system, comprising:

a door guide rail; and the carriage according to claim 8, wherein at least two mutually spaced engagement members are arranged in the door guide rail, wherein a first engagement member of the at least two mutually spaced engagement members is contactable at least with the detent lever of the extending device and wherein a second engagement member of the at least two mutually spaced engagement members is contactable with a catch member of the second retracting device.

10. The sliding door system according to claim 9, wherein the door guide rail has a cross-sectional area having a height and a width, wherein the height differs by a maximum of 15% from the width.

* * * * *